(12) United States Patent
Bhide et al.

(10) Patent No.: US 11,734,585 B2
(45) Date of Patent: Aug. 22, 2023

(54) POST-HOC IMPROVEMENT OF INSTANCE-LEVEL AND GROUP-LEVEL PREDICTION METRICS

(71) Applicant: International Business Machines Corporation, Armonk, NY (US)

(72) Inventors: Manish Bhide, Hyderabad (IN); Pranay Lohia, Hyderabad (IN); Karthikeyan Natesan Ramamurthy, Yorktown Heights, NY (US); Ruchir Puri, Yorktown Heights, NY (US); Diptikalyan Saha, Bangalore (IN); Kush Raj Varshney, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 377 days.

(21) Appl. No.: 16/214,703

(22) Filed: Dec. 10, 2018

(65) Prior Publication Data

US 2020/0184350 A1 Jun. 11, 2020

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ........... G06N 5/04; G06N 20/00; G06N 20/10
See application file for complete search history.

(56) References Cited

U.S. PATENT DOCUMENTS

| 8,521,993 | B2 | 8/2013 | Marden et al. |
| 8,725,663 | B1 * | 5/2014 | Triantaphyllou ...... G06N 20/00 706/12 |
| 8,838,414 | B2 | 9/2014 | Arndt et al. |
| 9,245,248 | B2 | 1/2016 | Solomon et al. |

(Continued)

FOREIGN PATENT DOCUMENTS

| CN | 104199536 A | 12/2014 |
| CN | 105426870 A | 3/2016 |

(Continued)

OTHER PUBLICATIONS

Kamiran et al., Decision Theory for Discrimination-aware Classification, 2012 IEEE 12th International Conference on Data Mining, pp. 924-929 (Year: 2012).*

(Continued)

*Primary Examiner* — Markus A. Vasquez
*Assistant Examiner* — William Wai Yin Kwan
(74) *Attorney, Agent, or Firm* — Peter Edwards, Esq.; McGinn IP Law Group, PLLC

(57) ABSTRACT

A post-processing method, system, and computer program product for post-hoc improvement of instance-level and group-level prediction metrics, including training a bias detector that learns to detect a sample that has an individual bias greater than a predetermined individual bias threshold value with constraints on a group bias, applying the bias detector on a run-time sample to select a biased sample in the run-time sample having a bias greater than the predetermined individual bias threshold bias value, and suggesting a de-biased prediction for the biased sample.

17 Claims, 11 Drawing Sheets

(56) References Cited

U.S. PATENT DOCUMENTS

| | | |
|---|---|---|
| 9,396,444 B2 | 7/2016 | Bates |
| 9,678,796 B2 | 6/2017 | Mukherjee et al. |
| 10,114,954 B1 | 10/2018 | Bellis et al. |
| 2016/0086091 A1 | 3/2016 | Ellis |
| 2016/0125292 A1 | 5/2016 | Seo et al. |
| 2016/0180234 A1 | 6/2016 | Siebach et al. |
| 2017/0372214 A1 | 12/2017 | Peng et al. |
| 2018/0025270 A1 | 1/2018 | John et al. |
| 2018/0121817 A1* | 5/2018 | Datta ............... G06N 5/048 |
| 2018/0268444 A1 | 9/2018 | Dong et al. |
| 2019/0122135 A1* | 4/2019 | Parker ............... G06N 20/00 |
| 2020/0082299 A1* | 3/2020 | Vasconcelos ....... G06N 20/00 |
| 2020/0372472 A1* | 11/2020 | Kenthapadi ........ G06N 20/20 |

FOREIGN PATENT DOCUMENTS

| | | |
|---|---|---|
| JP | A 2014-211761 | 11/2014 |
| WO | WO 2012/018694 A1 | 2/2012 |

OTHER PUBLICATIONS

Canetti et al., From Soft Classifiers to Hard Decisions: How fair can we be?, arXiv:1810.02003v1, Oct. 3, 2018, 36 pages (Year: 2018).*

Hardt et al., Equality of Opportunity in Supervised Learning, arXiv: 1610.02413v1, Oct. 2016, 22 pages (Year: 2016).*

Mel, et al. "The NIST Definition of Cloud Computing". Recommendations of the National Institute of Standards and. Technology. Nov. 16, 2015.

Krasanakis et al.; "Adaptive Sensitive Reweighting to Mitigate Bias in Fairness-Aware Classification", WWW'18 ACM World Wide Web Conf. on, pp. 853-862, Apr. 23-27, 2018.

Kusner et al.; "Counterfactual Fairness", NIPS'17 31st Conference on Neural Information Processing Systems, Mar. 20, 2017, pp. 1-18.

Madras et al.; "Predict Responsibly: Improving Fairness and Accuracy by Learning to Defer", Cornell University Library, pp. 1-20, Sep. 7, 2018.

Speicher et al.; "A Unified Approach to Quantifying Algorithmic . . . Indices", KDD'18 24th ACM SIGKDD International Conference on, pp. 2239-2248, Aug. 19-23, 2018.

International Search Report (ISR) (PCT Form PCT/ISA/220), PCT. IB2019/060288, dated Feb. 11, 2020.

The International Search Opinion (PCT/ISA/237) dated Feb. 11, 2020.

Patents Act 1977: Examination Report under Section 18(3) dated Sep. 16, 2022, in corresponding Great Britain Patent Application GB2108436.3.

Patents Act 1977: Examination Report under Section 18(3) dated Jun. 9, 2022, in corresponding Great Britain Patent Application GB2108436.3.

Patents Act 1977: Examination Report under Section 18(3) dated Jan. 12, 2023, in corresponding Great Britain Patent Application GB2108436.3.

Japanese Office Action, dated May 2, 2023, in Japanese Application No. 2021-528927 and English Translation thereof.

* cited by examiner

TRAINING A BIAS DETECTOR THAT LEARNS TO DETECT A SAMPLE THAT HAS AN INDIVIDUAL BIAS GREATER THAN A PREDETERMINED INDIVIDUAL BIAS THRESHOLD VALUE WITH CONSTRAINTS ON A GROUP BIAS —— 101

APPLYING THE BIAS DETECTOR ON A RUNTIME SAMPLE TO SELECT A BIASED SAMPLE IN THE RUNTIME SAMPLE HAVING A BIAS GREATER THAN THE PREDETERMINED INDIVIDUAL BIAS THRESHOLD BIAS VALUE —— 102

SUGGESTING A DE-BIASED PREDICTION FOR THE BIASED SAMPLE —— 103

Algorithm 1 Individual+Group Debiasing (IGD) Post-Processing
---

Given classifier $\hat{y}$ trained on training set $\{(\mathbf{x}_i, d_i, y_i)\}$, and
    Given validation set $\{\mathbf{x}_j \mid d_j = 0\}$, compute individual bias
    scores $\{b_{S,j} \mid d_j = 0\}$.
    if $b_{S,j} > \tau$ then
        $\beta_j \leftarrow 1$
    else
        $\beta_j \leftarrow 0$
    end if
    Construct auxiliary dataset $\{(\mathbf{x}_j, \beta_j) \mid d_j = 0\}$.
    Train individual bias detector $\hat{b}$ on auxiliary dataset.
    for all run-time test samples $(\mathbf{x}_k, d_k)$ do
        $\hat{y}_k \leftarrow \hat{y}(\mathbf{x}_k, d_k)$
        if $d_k == 0$ then
            $\hat{b}_k \leftarrow \hat{b}(\mathbf{x}_k)$
            if $\hat{b}_k == 1$ then
                $\tilde{y}_k \leftarrow \hat{y}(\mathbf{x}_k, 1)$
            else
                $\tilde{y}_k \leftarrow \hat{y}_k$
            end if
        else
            $\tilde{y}_k \leftarrow \hat{y}_k$
        end if
    end for

POST-HOC IMPROVEMENT OF INSTANCE-LEVEL AND GROUP-LEVEL PREDICTION METRICS

BACKGROUND

The present invention relates generally to a post-processing method, and more particularly, but not by way of limitation, to a system, method, and recording medium for increasing both individual and group fairness in post-processing via an individual bias detector used to prioritize data samples in a bias mitigation algorithm aiming to improve the group fairness measure of disparate impact.

Conventionally, post-processing approaches for increasing the fairness of predictions of biased classifiers address only group fairness. Fairness, non-discrimination, and unwanted bias have always been concerns in human decision-making, but are increasingly in the limelight because historical human decisions are now being used as training data for machine learning models in high stakes applications such as employment, credit, and criminal justice. Without bias mitigation, models trained on such decisions perpetuate and scale human biases and are thereby unsafe and untrustworthy. There has been a recent surge in activity on algorithmic fairness in the machine learning and data mining literature, with basic principles defined using detection, estimation theory and information theory.

Conventionally, there are two main notions of fairness in decision-making: group fairness and individual fairness. Group fairness, in its broadest sense, partitions a population into groups defined by protected attributes and seeks for some statistical measure to be equal across groups. There are many different group fairness notions involving different statistical measures, one such notion being disparate impact. Individual fairness, in its broadest sense, seeks for similar individuals to be treated similarly. Checking for group fairness is a straightforward computation of statistical metrics, but checking for individual fairness is more computationally involved when there are many protected attributes with many values and scoring samples using a model is expensive. Unified metrics for both group and individual fairness have recently been proposed based on inequality indices.

Machine learning pipelines contain three possible points of intervention to mitigate unwanted bias: the training data, the learning procedure, and the output predictions, with three corresponding classes of bias mitigation algorithms: pre-processing, in-processing, and post-processing. Advantages of post-processing algorithms are that they do not require access to the training process and are thus suitable for run-time environments. Moreover, post-processing algorithms operate in a black-box fashion, meaning that they do not need access to the internals of models, their derivatives, etc., and are therefore applicable to any machine-learning model.

Conventionally, the vast majority of bias mitigation algorithms address group fairness, but a few address individual fairness. Some pre-processing algorithms address both group and individual fairness. All existing post-processing algorithms are only for group fairness.

Thus, there is a need in the art for a post-processing bias mitigation technique that considers both group and individual fairness. Moreover, there is a need in the art for a technique that does not require any ground truth class labels in the validation samples while training the bias mitigation algorithm.

As such, there is a need in the art for attack methods that can be adapted to create effective explanation methods.

SUMMARY

The general methodology of post-processing algorithms is to take a subset of samples and change their predicted labels appropriately to meet a group fairness requirement. An interesting observation about post-processing is that any sample can be altered to achieve group fairness requirements because the metrics are expectations. In view of the problems in the art, the inventors choose samples that have, or are likely to have, individual fairness issues and in this way are able to address both group and individual fairness together. The starting point for the inventive approach that solves problems in the art is an individual bias detector, which finds samples whose model prediction changes when the protected attributes change, leaving all other features constant. Despite a large set of efficiencies enacted in the technique, it is still computationally expensive. To overcome the limitation of not being able to run the detector continually, the invention checks for individual fairness on a small set of points and generalizes from them by training a classifier that is applied to new samples. The samples with likely individual bias are the ones considered for a change of predicted label. By doing so, the invention improves upon the art from focusing on uncertainty to focusing on individual bias.

In an exemplary embodiment, the present invention can provide a post-processing computer-implemented method for post-hoc improvement of instance-level and group-level prediction metrics, the post-processing method including training a bias detector that learns to detect a sample that has an individual bias greater than a predetermined individual bias threshold value with constraints on a group bias, applying the bias detector on a run-time sample to select a biased sample in the run-time sample having a bias greater than the predetermined individual bias threshold bias value, and suggesting a de-biased prediction for the biased sample.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which FIG. 1 exemplarily shows a high-level flow chart for a post-processing method 100;

FIG. 4 exemplarily depicts a first algorithm for the method 100 according to an embodiment of the present invention;

DETAILED DESCRIPTION

Figure 2:
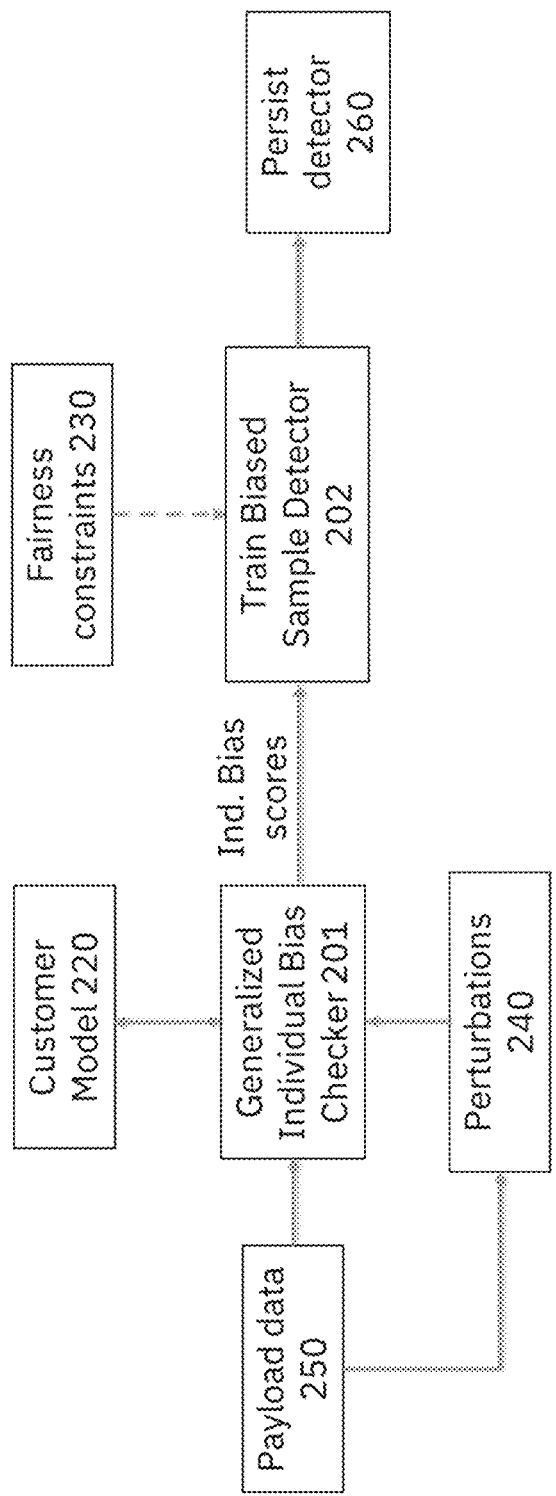
FIG. 2 exemplarily depicts a training phase of the method 100 according to an embodiment of the present invention.

The invention will now be described with reference to FIGS. 1-11, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the example depicted in FIG. 1, the post-processing method 100 includes various steps that are suitable for run-time environments, that are a black-box approach applicable to any probabilistic machine learning model (or amalgamation of models), and also improves both individual and group fairness metrics.

Figure 9:
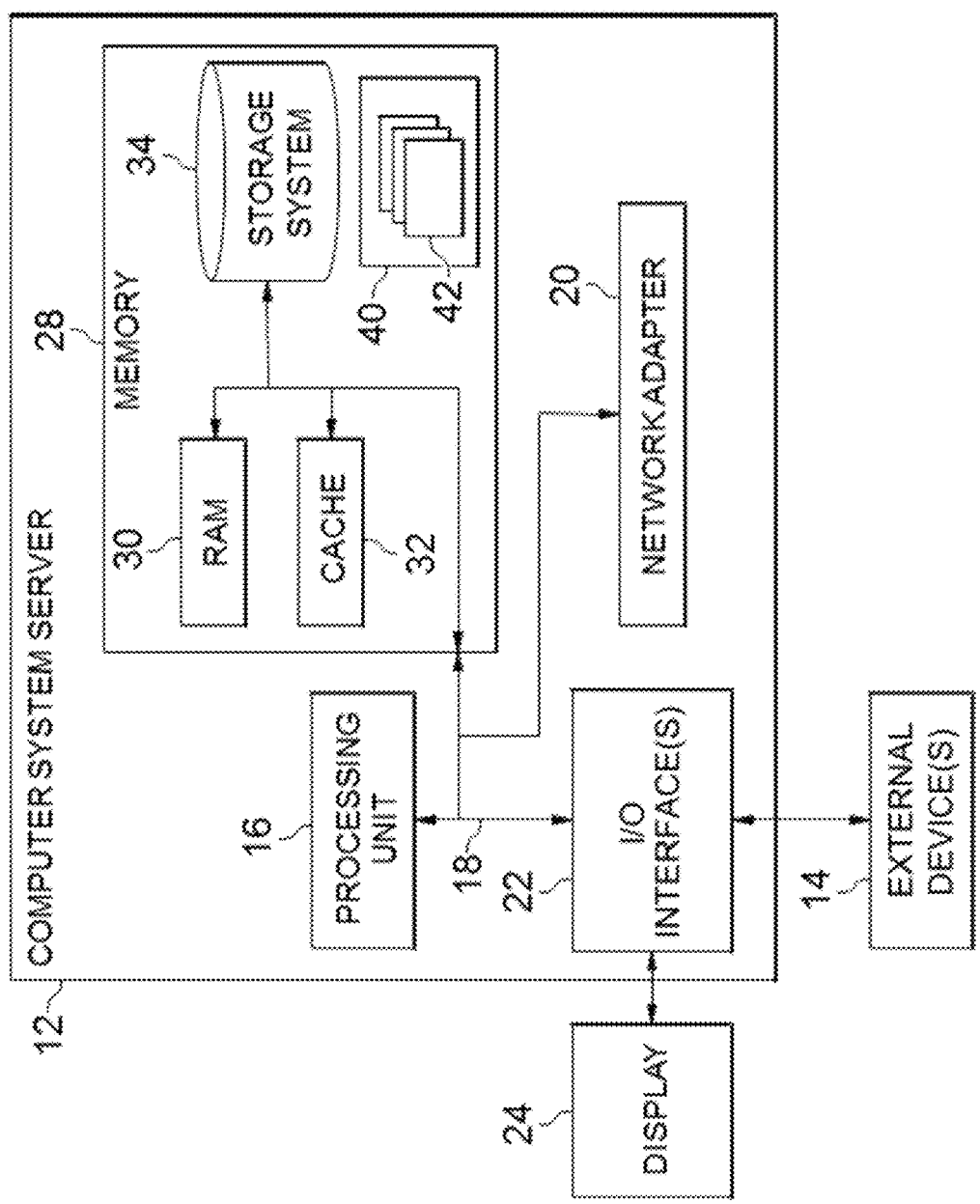
FIG. 9 depicts a cloud computing node 10 according to an embodiment of the present invention.

As shown in at least FIG. 9, one or more computers of a computer system 12 according to an embodiment of the present invention can include a memory 28 having instructions stored in a storage system to perform the steps of FIG. 1.

Although one or more embodiments (see e.g., FIGS. 9-11) may be implemented in a cloud environment 50 (see e.g., FIG. 10), it is nonetheless understood that the present invention can be implemented outside of the cloud environment.

With reference generally to FIGS. 1-8, the invention considers a supervised classification problem with features $X \in \mathcal{X}$, categorical protected attributes $D \in \mathcal{D}$, and categorical labels $Y \in \mathcal{Y}$. Given a set of training samples $\{(x_1, d_1, y_1), \ldots, (x_n, d_n, y_n)\}$, the invention learns a classifier (i.e., step 101) $\hat{y}: \mathcal{X} \times \mathcal{D} \to \mathcal{Y}$.

It is noted that 'classifier' and 'bias detector' are used interchangeably.

For ease of exposition, a scalar binary protected attribute (i.e., $D=\{0, 1\}$) and a binary classification problem (i.e., $Y=\{0, 1\}$) are considered. The value $d=1$ is set to correspond to a 'privileged group' (e.g., a first group in the United States in criminal justice applications) and $d=0$ to an 'unprivileged group' (e.g. a second group in the United States in criminal justice applications that receives negative treatment in comparison to the first group, or in a business setting receiving a loan or not receiving a loan). The value $y=1$ is set to correspond to a 'favorable outcome' (e.g., receiving a loan or not being arrested) and $y=0$ to an 'unfavorable outcome' (e.g., not receiving a loan or being arrested).

Based on the context, probabilistic binary classifiers are also used with continuous output scores $\hat{y}_S \in [0, 1]$ with a threshold to $\{0, 1\}$. The present invention however is extendable to the ease of multiple protected attributes and multi-class outcomes. Indeed, multiple classes may have multiple 'favorable' or 'unfavorable' outcomes.

One definition of individual bias is as follows. Sample i has individual bias if $\hat{y}(x_i, d=0) \neq \hat{y}(x_i, d=1)$. Let $b_i = I[\hat{y}(x_i, d=0) \neq \hat{y}(x_i, d=1)]$, where $I[\cdot]$ is an indicator function. The individual bias score, $b_{S,i} = \hat{y}_S(x_i, d=1) - \hat{y}_S(x_i, d=0)$, is a soft version of $b_i$. To compute an individual bias summary statistic, the average of $b_i$ across test samples are taken.

One notion of group fairness known as 'disparate impact' is defined as follows. There is 'disparate impact' if equation (1) is less than $1-\varepsilon$ or greater than $(1-\varepsilon)^{-1}$, where a common value of $\varepsilon$ is 0.2.

$$\frac{\mathbb{E}[\hat{y}(X, D) | D = 0]}{\mathbb{E}[\hat{y}(X, D) | D = 1]} \quad (1)$$

To test generation for individual bias detection, there are two distinct problems in individual bias detection. First, determining whether there are any cases of individual bias. Secondly, determining the individual bias status of all samples.

The invention includes an improvement to this on a technique in which for the first problem that systematically explores the decision space of any black box classifier (e.g., customer model) to generate test samples that have an enhanced chance of being biased.

The method uses two kinds of searches. First, a global search, which explores the decision space such that diverse areas are covered. Second, a local search which generates test cases by intelligently perturbing the values of non-protected features of an already found individually-biased sample. One exemplary key idea is to use dynamic symbolic execution, an existing systematic test ease generation technique for programs that generate search constraints by negating the constraints in a program path and uses a constraint solver to find new search paths. This algorithm is useful in solving the second of the distinct problems from a computational perspective when used on a batch of samples in settings involving a large number of attributes and attribute values.

However, to achieve acceptable group fairness, various post-processing methods may be applied to change the label outputs of the classifier $\hat{y}_i$ to other labels $\check{y}_i \in \mathcal{Y}$. A reject option classification (ROC) method of considers uncertain samples with $|\hat{y}_S - 0.5| < \theta$ (assuming 0.5 is the classification threshold) for some margin parameter $\theta$ and assigns $\check{y}_i = 1$ for samples with $d_i = 0$ and assigns $\check{y}_i = 0$ for samples with $d_i = 1$. For certain samples outside the so-called 'reject option' band, $\check{y}_i = \hat{y}_i$. The $\theta$ value may be optimized to achieve the requirement on disparate impact.

The invention includes a fairness post-processing algorithm. A key observation in post-processing for group fairness metrics like disparate impact is that since they are defined as expectations, the individual samples are exchangeable. The invention elects samples from parts of X that likely have individual bias. The invention does this by first an individual bias detection (e.g., using the trained bias detector) and then using a post-processing bias mitigation algorithm (e.g., changing a result of an underprivileged group to a result of the favorable class).

For the individual bias detection, consider a classifier ŷ already trained on a training dataset partition. The invention can evaluate the individual bias definition provided above on a validation partition that has no labels to go alongside with it. Some of these validation samples will have individual bias and some will not. Under an assumption of some coherence or smoothness of individual bias in X, the invention can learn a classifier or detector (e.g., bias detector) for individual bias from this validation set that will generalize to unseen samples whose individual bias is unknown (e.g., in step 101).

One may use any classification or anomaly detection algorithm here that provides score outputs. The invention exemplarily uses logistic regression in the empirical results.

Formally, by perturbing the $d_j$ of validation set samples $(x_j, d_j)$, j=1, . . . , m, that belong to the unprivileged group ($d_j$=0), the invention obtains individual bias scores $b_{s,j}$. The invention further constructs a dataset $\{(x_1, \beta_1), \ldots, (x_m, \beta_m)\}$, and this is used to train an individual bias detector b(•). $\beta_j$ is 1 for the samples that have the highest individual bias scores, and 0 for the rest. This assignment is determined by a threshold τ (e.g., 'a predetermined individual bias threshold value') on the individual bias scores chosen based on the disparate impact constraint on the entire validation set. This is similar to an algorithm where the margin parameter is adjusted based on disparate impact requirements.

For example, FIG. 2 exemplarily depicts the training stage for the bias detector. The training receives payload data 250 (e.g., samples) which are run through the individual bias checker 201 using perturbations 240 (i.e., perturbing the $d_j$ of validation set samples) to obtain individual bias scores. The checker 201 confers with a customer model 220 which is the constraints on the result (e.g., who should receive approval or not). The customer model is an exemplary black-box data set received from a potential client (e.g., a bank, government, corporation, etc.). A dataset $\{(x_1, \beta_1), \ldots, (x_m, \beta_m)\}$ is used to train the biased sample detector 202 with an input of the individual bias scores from the generalized individual bias checker 201. That is, the individual bias scores are found by perturbing the protected attribute(s) in training set via the perturbations 240, for each sample point, obtaining the average score after possibly multiple perturbations, obtaining a difference in scores for a favorable class where for privileged groups, do original and average perturbed scores, and, for 'unprivileged groups', do average perturbed for original scores, and sorting samples by descending order of score difference (highest to lowest individual bias).

As discussed above, group fairness constraints 230 are used to train the biased sample detector 202 where $\beta_j$ is 1 for the samples that have the highest individual bias scores, and 0 for the rest. This assignment is determined by a threshold τ (e.g., 'a predetermined individual bias threshold value') on the individual bias scores chosen based on the disparate impact constraint on the entire validation set. The trained biased sample detector 202 identifies an optimal set of biased sample points from the sorted samples, de-biases each point starting at the top and checks group bias until it reaches an acceptable level, labels examples that were de-biased as '+1' and those that were not de-biased as '−1'. The invention labels only the unprivileged group examples. The privileged group examples will not be considered. From these labeled examples, a classifier (nearest neighbor, logistic regression, random forests, etc.) is trained that detects biased samples. This classifier must be capable of providing soft bias likelihoods. The persist detector 260 saves the bias detector model in the memory for future use.

Thereby, in the training, group fairness metrics can be improved by altering any sample equivalently, and thus one can focus on samples likely to have individual bias. This generalizes from a computationally expensive individual bias checker to create a model that identifies new samples that likely have individual bias and to alter these samples first to achieve group fairness metric requirements.

It is noted that one may argue that a trained individual bias detector is unnecessary and one should simply compute $b_i$ for all samples as they come at run-time because doing so only involves scoring using the black-box classifier model. This may be true, but with the following caveats. Firstly, it is assumed $d_i$ to be scalar and binary, when in many instances it is not. Therefore, computing $b_i$ may require several model evaluations, which could be prohibitive, especially in the industrial usage where it is assumed that each sample that is scored costs a certain amount of money to be paid by the entity deploying the model and remediating the bias. Secondly, the invention computes the binary βj values based on the group fairness constraint, which ensures that only examples with highest individual bias scores are considered for de-biasing, and there is no overcompensation. This level of control is not possible if all examples are considered with bi=1 to be equally biased.

Once the individual bias detector $\hat{b}$ is trained on the validation set (i.e., step 101), the bias mitigation algorithm is applied in run-time to test samples as follows (i.e., step 102). Each sample from the unprivileged group ($d_i$=0) is tested for individual bias and if it is likely to have individual bias (i.e., $\hat{b}_i$=1), then this sample is assigned the outcome it would have received if it were in the favorable class, (i.e., $\check{y}_i = \hat{y}(x_{k,1})$). To encode a human sensibility similar to invention, all other samples are left unchanged, including samples from the privileged group. The algorithm as shown in FIG. 4 exemplarily summarizes the above narrative.

Figure 3:
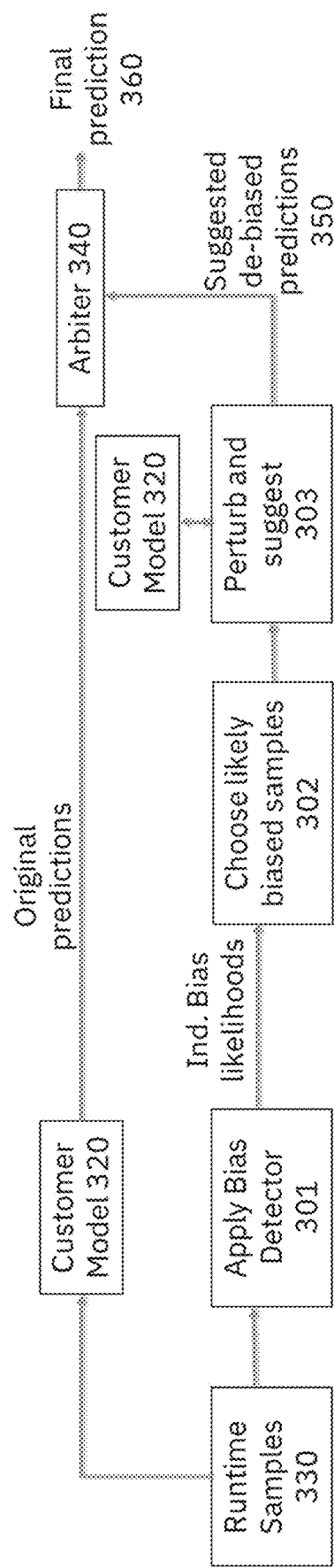
FIG. 3 exemplarily depicts a run-time phase of the method 100 according to an embodiment of the present invention.

As shown in FIG. 3, in a run-time environment (i.e., steps 102-103), there is already a trained customer model as well as the inventive bias detector model. At periodic intervals, an individual bias check is conducted on test samples and generalized to the entire feature space. When a new unlabeled sample comes in, the model scores it and the generalized individual bias checker predicts whether it will have individual bias. These predictions are fed into the post-processing bias mitigation algorithm which determines how to alter the score (e.g., via perturb and suggest 303 and suggested de-biased prediction 350) to achieve both individual and group fairness metrics. An arbiter 340 at the end allows the user the option to choose the original model prediction or altered prediction as the final output prediction 360.

That is, the biased sample detector and de-bias in a run-time are applied to the test examples 330 according to their soft bias likelihoods in descending order via applying the bias detector 301. If the individual bias likelihood is greater than a threshold (as determined in 302), then the invention proceeds on with 303 and further for those examples. The invention does not check for group bias. For this reason, the proposed approach can apply on even one example at run-time.

This is performed only for the 'unprivileged group' examples. From the samples as identified by 302, de-bias each point starting at the top and check group bias until it reaches an acceptable level. The de-biased predictions 350 is performed in post-processing by de-biasing procedure for each sample point by perturbing the protected attribute(s) in a training set (e.g., in 303 of FIG. 3), run the perturbed examples through customer model 320, and picking the most likely prediction for the perturbed data as suggested values to modify.

Thereby, samples predicted to have highest individual biases (among the 'unprivileged group') by the detector are prioritized for correction, suggested correction involves running perturbed examples through the customer model and picking the most likely prediction, and an arbiter can decide whether to choose the original or the suggested de-biased prediction. Also, for the privileged group, the invention does not compute individual bias at all, as the invention only focuses on the unprivileged group.

In one embodiment, the operation is similar to above, except that the perturbations are performed across protected attributes and an aggregate score/outcome is determined. In another embodiment, for multiple classes, the operation is similar, except that the invention chooses an outcome among the multiple classes, rather than a binary class. This can be performed in several ways looking at the aggregate prediction scores for each class after perturbations, finding the most likely predicted outcome after perturbations, or in any user defined manner. 'Class' may be 'privileged or underprivileged'.

Algorithmic fairness is an important topic for business and society, and developing new bias mitigation algorithms that address as many facets of fairness as possible is critical. The invention disclosed herein includes a new post-processing algorithm that targets samples with individual bias for remediation in order to improve both individual and group fairness metrics and shown that it does so empirically on several real-world datasets without much loss in classification accuracy. The machine learning industry is moving towards paradigms in which there will be a separation between model building and model deployment. This will include a limited ability for deployers to gain access to the internals of pre-trained models. Therefore, post-processing algorithms, especially ones that can treat a classifier as a complete black-box are necessary. In comparison to previous work, the method 100 not only tackles both individual and group fairness, but also is a pure run-time approach because it does not require ground truth class labels for the validation set.

It is noted that "class" usually denotes the outcome. For example, if one has a loan approved would be considered as 'favorable', and loan denied would be considered as 'unfavorable'. "Group" denotes a demographic such as a protected group. For example, one demographic could be a "privileged group", and a second demographic could be "unprivileged group".

In view of the above descriptions of the invention, the invention may improve both instance-level and group-level metrics post-hoc for predictions from a machine learning model. One example of a group-level metric is group bias. Group-level and instance-level metrics can include, for example, if have a system that provides some utility to each individual, and the user wants to ensure some level of guarantee for qualified individuals, as well as some guarantee at the aggregated group level. In this case, the invention can use a variation of the proposed approach. Generally average guarantees at group level does not ensure guarantee for each qualified individual.

The invention improves instance-level and group-level metrics by training a bias detector that learns to detect samples that have high individual bias, with constraints on group bias. The invention then applies the bias detector on novel run-time samples, to choose likely biased samples and suggest de-biased predictions for them.

During the training stage of the bias detector, the invention implements an individual bias checker that perturbs the protected attribute in the payload data for the unprivileged group samples, and computes the individual bias scores for them by finding the difference between the probability of favorable outcomes for the perturbed and the original data. In case of multiple perturbations, the average probability of favorable outcomes is used. Unprivileged group samples that have high individual bias are flagged as "biased samples" and this process is repeated until group bias constraints are met. The bias detector is trained to discriminate between the flagged and the un-flagged samples.

During the run-time/application stage, the invention applies the bias detector on each unprivileged group sample in run-time, and computes the likelihood of individual bias. The most likely biased samples are chosen for further testing. Further testing involves perturbing the protected attribute and checking the predictions after perturbation. In case of multiple perturbations, the outcomes of the multiple perturbations are aggregated into a single outcome. If the outcome after perturbation is different from the original outcome, then it is suggested as a de-biased prediction to an arbiter, which can choose between the original and de-biased predictions based on further considerations (e.g., see FIG. 3).

The invention can perform multiple perturbations for a protected attribute. Because of this, the invention can handle both numerical and categorical protected attributes. Multiple protected attributes can also be used. Also, the invention can handle general categorical outcomes, where a selection of outcomes are deemed favorable, and the rest unfavorable.

EXPERIMENTAL RESULTS

The method 100 above is evaluated on three standard datasets: UCI Adult (an income dataset based on a 1994 US Census database; 45,222 samples; favorable outcome: income greater than $50,000; protected attributes: sex, race), UCI Statlog German Credit (a credit scoring dataset; 1,000 samples; favorable outcome: low risk; protected attributes: sex, age), and ProPublica COMPAS (a prison recidivism dataset; 6,167 samples. favorable outcome: does not re-offend; protected attributes: sex, race). Each of the three datasets has two binary protected attributes that we consider as two different problems, yielding six problems overall. The results of the method 100 are compared with a reject option classification (ROC) technique and an equalized odds post-processing (EOP) technique.

The datasets are processed and loaded using an exemplary AI Fairness 360 toolkit and randomly divide it into 60% training, 20% validation and 20% testing partitions. These experiments are conducted with 25 such random partitions of the datasets, allowing to provide error bars in the empirical results that follow. Using the training partition, the experiment fit both $L_2$-regularized logistic regression and random forests as black-box classifiers. For random forests, the experiment sets the number of trees to 100 and the minimum samples per leaf node to 20.

The parameters of all three bias mitigation approaches are optimized on the validation partition of the dataset. Both the ROC and the EOP approaches require ground truth class labels in the validation set, whereas the method 100, being a pure run-time method, does not. ROC and the method 100 are optimized to achieve 'disparate impact' in the range (0.8, 1.25), i.e., $\varepsilon=0.02$. EOP, being designed for equalized odds rather than 'disparate impact', cannot be optimized for ranges of disparate impact.

In the subsections that follow, the experiment first demonstrates the efficacy of the individual bis detector used in the proposed method 100 and then compare the three algorithms for classification accuracy, disparate impact, and individual fairness.

Figure 6:
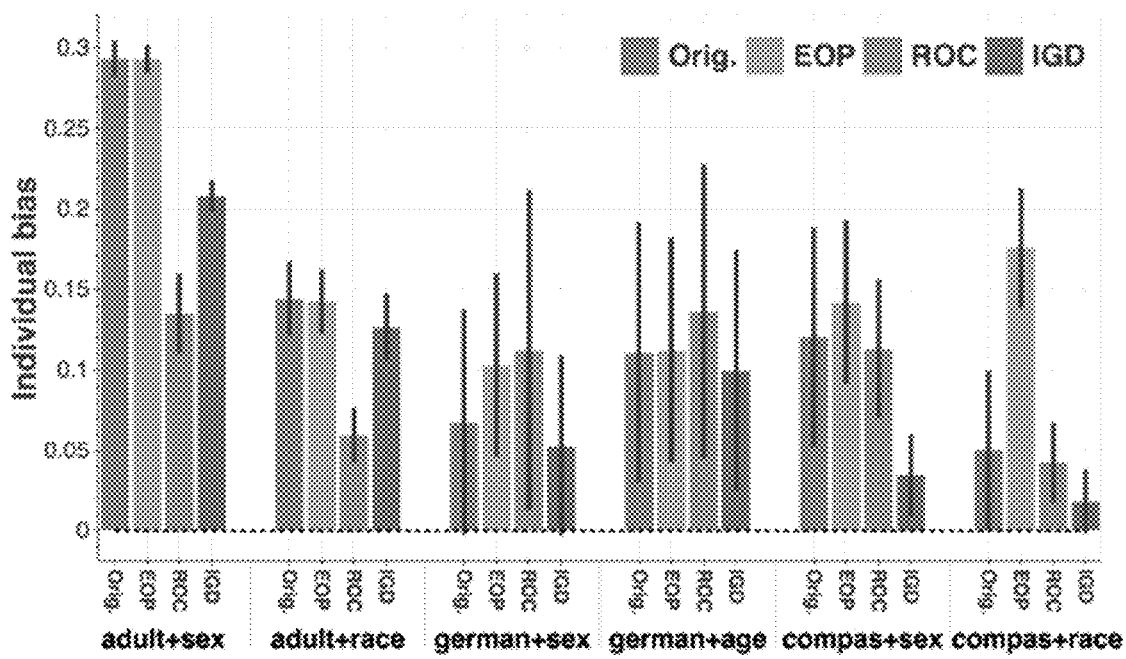
FIG. 6 exemplarily depicts a second result of the method 100 according to an embodiment of the present invention.
Figure 7:
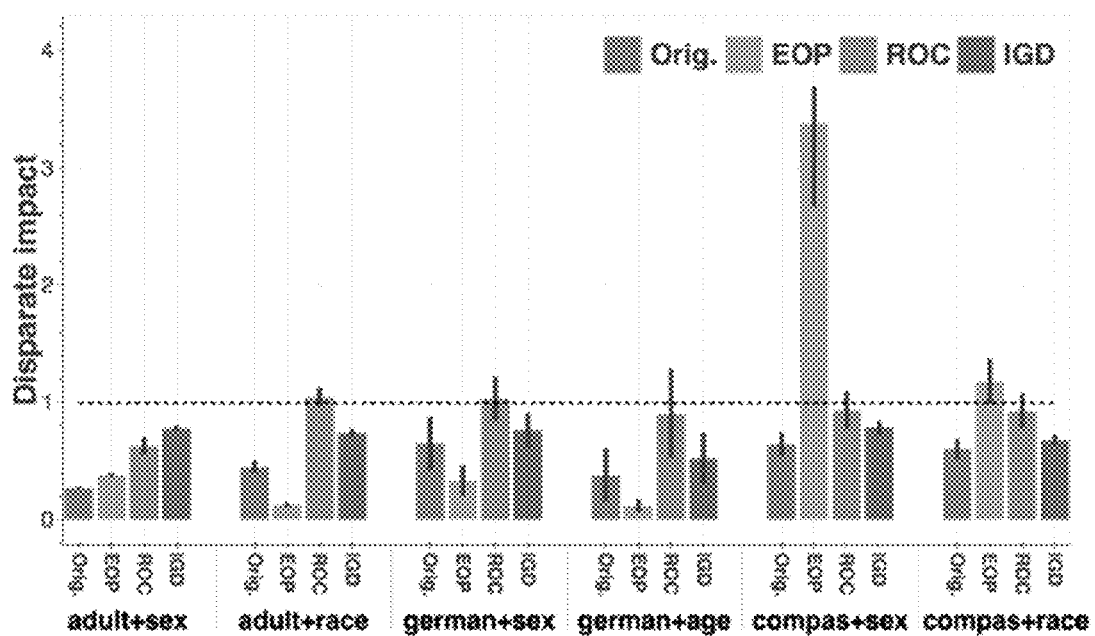
FIG. 7 exemplarily depicts a third result of the method 100 according to an embodiment of the present invention.
Figure 8:
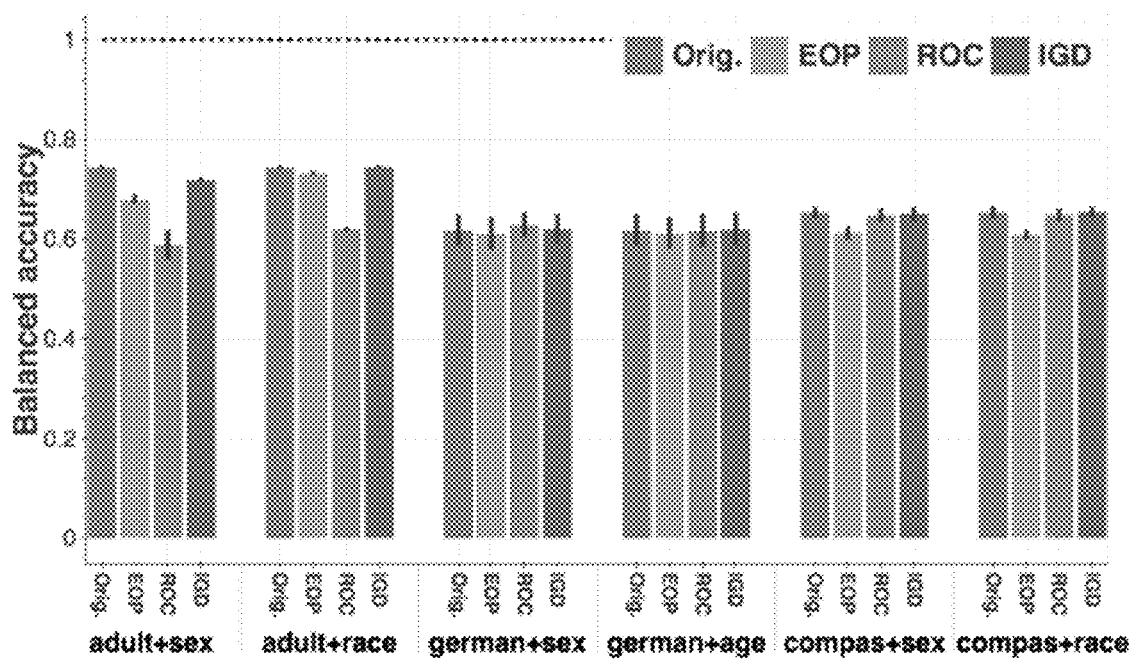
FIG. 8 exemplarily depicts a fourth result of the method 100 according to an embodiment of the present invention.

It is noted that in FIGS. 6-8, the 'IGD' label corresponds to the results for method 100.

Figure 5:
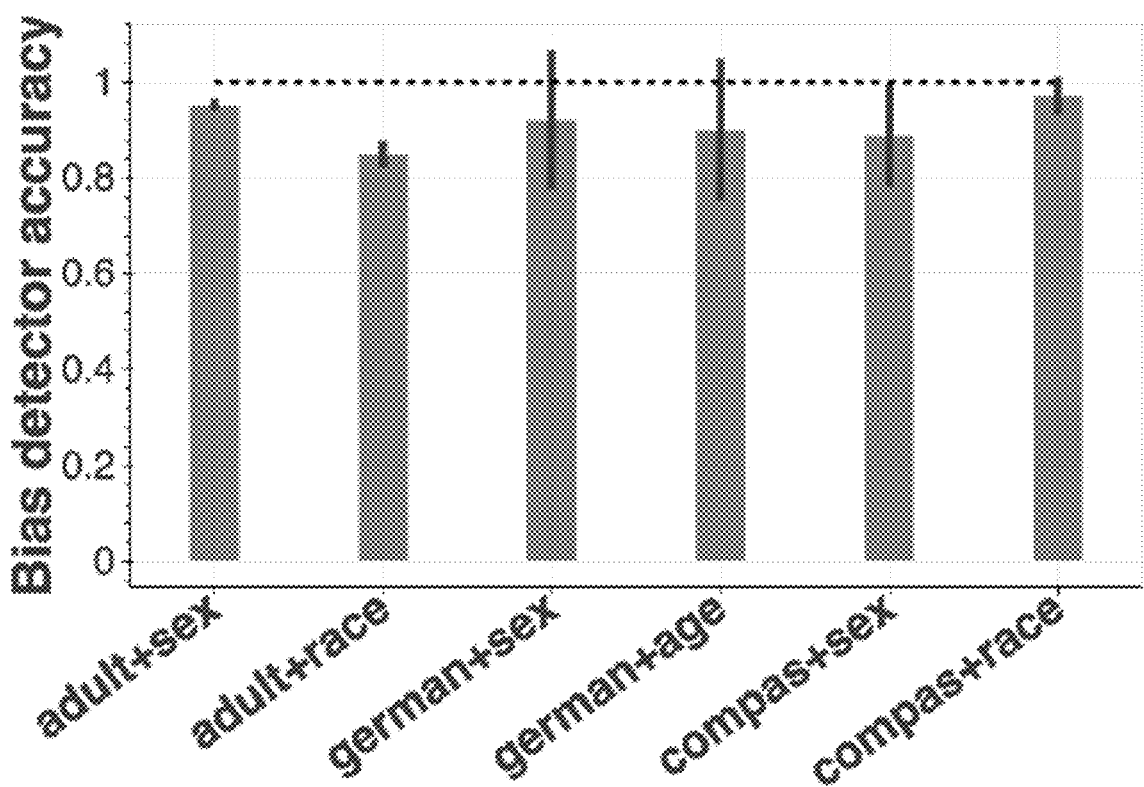
FIG. 5 exemplarily depicts a first result of the method 100 according to an embodiment of the present invention.

With reference to FIG. 5 which provides a depiction of validation results on individual bias generalization, the experiment verifies the generalization performance of the individual bias detector on unseen test data. Since the individual bias detector is used only on unprivileged group samples (d=0), its performance measure is only computed for this subset. The ground truth labels for the bias detector are obtained by actually computing the individual bias scores ($b_{S,k}$) for all 'unprivileged group' samples in the test data, and identifying the ground truth bias labels ($\beta_k$) based on the 'disparate impact' constraint. These labels are compared with the labels predicted by the bias detector ($\hat{b}_k$), and the balanced classification accuracy is computed.

This performance of the bias detector shown in FIG. 5 for all dataset and protected attribute combinations when the black-box classifier is logistic regression. All accuracy values are more than 0.85, which illustrates its clear effectiveness for the purpose at hand. The detector performs similarly when the black-box classifier is random forests, with a minimum accuracy of approximately 0.80.

For fairness comparisons, the experiment uses three measures for comparing EOP, ROC, and the method 100: (a) individual bias, (b) disparate impact, and (c) balanced classification accuracy. These measures are computed using the post-processed predictions ỹ. The individual bias measure is the summary statistic discussed above, the disparate impact measure s defined in equation (1) and balanced classification accuracy is the mean of true positive and true negative rates obtained for the predictions ỹ with respect to the true labels y. The experiment also obtains these measures for the original (Orig.) predictions ŷ. As shown in FIGS. 6-8, the method 100 is the only one that consistently improves both fairness measures while keeping the accuracy close to that of the original classifier. All results are shown for logistic regression as the black-box classifier, but similar results are also observed for random forests (omitted due to space constraints).

Based on the experiments, in individual bias, the method 100 performs the best for the German and COMPAS datasets. The ROC method performs the best for the Adult dataset, at the expense of reducing the balanced accuracy. Sometimes the EOP and ROC methods increase the individual bias, which is never the case with method 100. The method 100 also consistently improves disparate impact over the original predictions, although outperformed by the ROC method in five out of six cases. The strong performance of the ROC approach is likely because it does not also optimize for individual bias. The EOP method performs poorly on disparate impact, likely because it was designed to equalize odds, which may or may not always result in improved 'disparate impact'.

The method 100 is also the best in preserving the balanced classifier accuracy compared to the original predictions even though no ground truth labels are used in the validation partition.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity; capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 9, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 10:
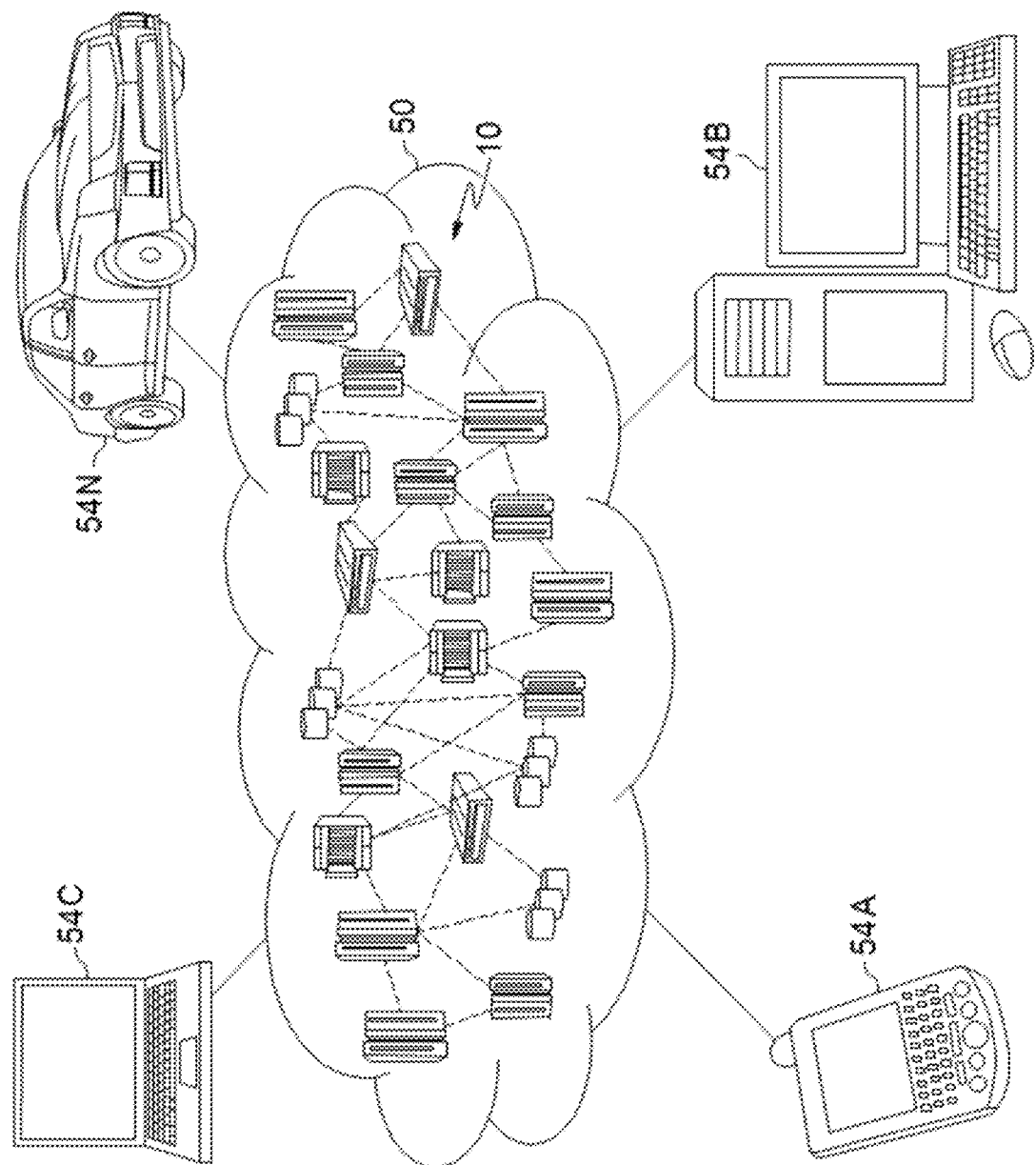
FIG. 10 depicts a cloud computing environment 50 according to an embodiment of the present invention.

Referring now to FIG. 10, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 10 are intended to be illustrative only and that computing nodes 10 and cloud computing environment 50 can communicate with any type of computerized circuit over any type of network and/or network addressable connection (e.g., using a web browser).

Figure 11:
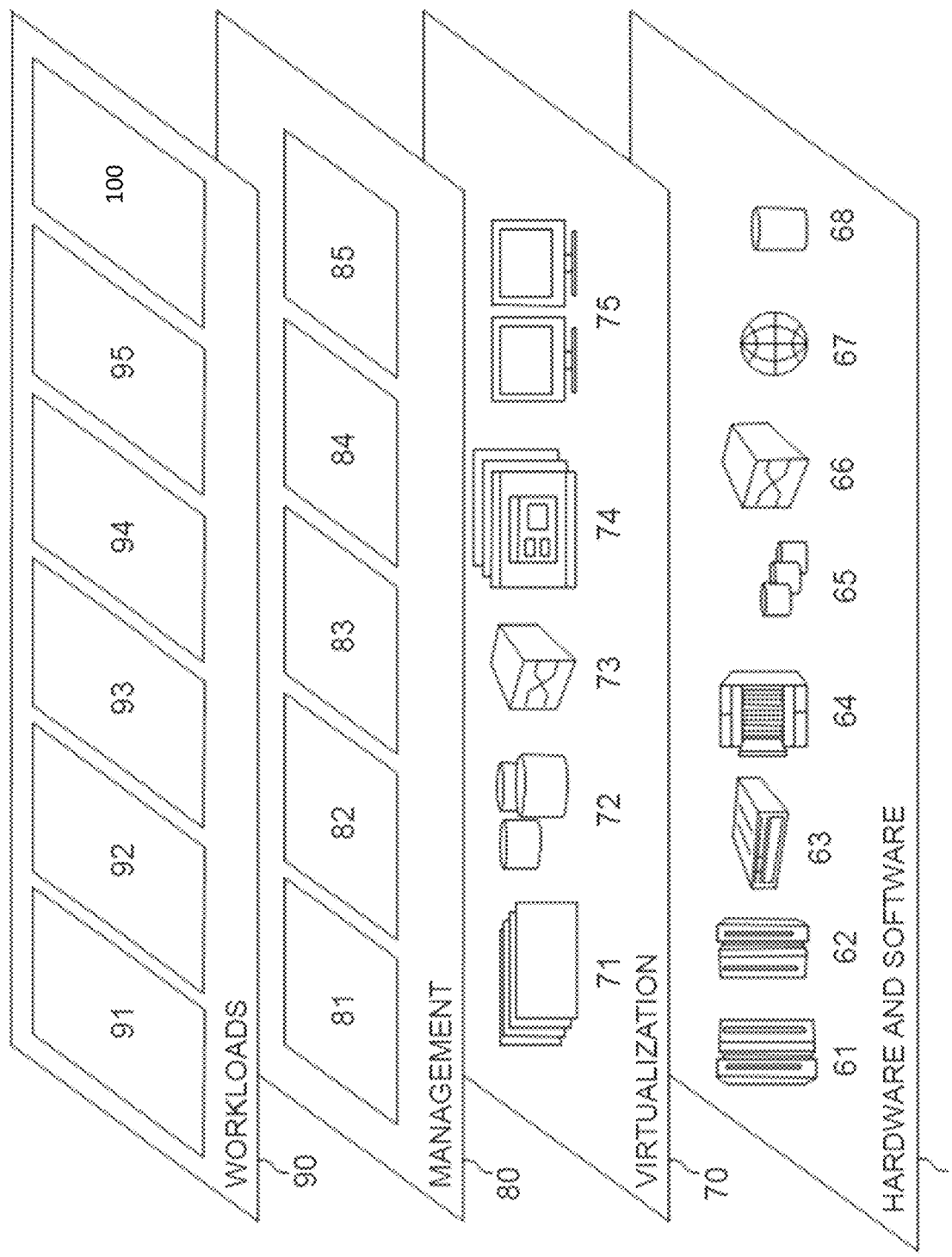
FIG. 11 depicts abstraction model layers according to an embodiment of the present invention.

Referring now to FIG. 11, an exemplary set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the method 100.

The present invention may be a system, a method, and/or a computer program product at any possible technical detail level of integration. The computer program product may include a computer readable storage medium (or media) having computer readable program instructions thereon for causing a processor to carry, out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction set-architecture (ISA) instructions, machine instructions, machine dependent instructions, microcode, firmware instructions, state-setting data, configuration data for integrated circuitry, or either source code or object code written in any combination of on e or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or rift to an equivalent of any element or feature of the amended claim.

What is claimed is:

1. A post-processing computer-implemented method for post-hoc improvement of instance-level and group-level prediction metrics, the post-processing method comprising:
    training a bias detector on a payload data that learns to detect a sample in a customer model that has an individual bias greater than a predetermined individual bias threshold value with constraints on a group bias, the sample being a member of an unprivileged group, wherein, during the training:
        the bias detector perturbs a protected attribute in the payload data for the unprivileged group and computes the individual bias as an individual bias score by finding a difference between a probability of a favorable outcome for the perturbed protected attribute to original data of the payload data;
        flagging the unprivileged group samples that have the individual bias greater than the predetermined individual bias threshold value; and
        training the bias detector to discriminate between the flagged samples and un-flagged samples;
    applying, in a run-time, the bias detector on a run-time sample to select a biased sample in the run-time sample having an individual bias greater than the predetermined individual bias threshold value; and
    suggesting, in the run-time, a de-biased prediction for the biased sample by perturbing the protected attribute and checking for bias after perturbation.

2. The post-processing computer-implemented method of claim 1, wherein the applying and the suggesting operate in a post-processing and targets the biased sample with individual bias for remediation in order to change bias of the biased sample based both on individual and group fairness metrics.

3. The post-processing computer-implemented method of claim 1, wherein the bias detector is trained by:
    for each sample point in the training set, obtaining an average individual bias after multiple perturbations;
    obtaining a difference in the individual bias for a favorable class;
    for the unprivileged group, setting the individual bias as the average individual bias; and
    sorting samples in the training set by descending order of the difference in the individual bias to the favorable class.

4. The post-processing computer-implemented method of claim 1, wherein the suggesting the de-biased prediction is performed by:
  perturbing the protected attribute in a training set;
    picking a most likely prediction for the perturbed results run through the customer model; and
  changing to the most likely prediction for the perturbed results for the unprivileged group member if the most likely prediction for the perturbed results belongs to the favorable class.

5. The post-processing computer-implemented method of claim 1, wherein a detected individual bias sample among the unprivileged group predicted by the bias detector is prioritized for a correction by the suggesting, and
  wherein a user decides whether to choose an original value of the bias or the suggested de-biased prediction.

6. The post-processing computer-implemented method of claim 5, wherein the perturbations are performed across protected attributes and an aggregate outcome is determined.

7. The post-processing computer-implemented method of claim 5, wherein an outcome among multiple classes of the bias is chosen by one of:
  looking at an aggregate prediction for each class of the multiple classes after perturbations; and
  finding a most likely predicted outcome after the perturbations.

8. The post-processing computer-implemented method of claim 1, wherein, during the run-time:
  the applying applies the bias detector on the unprivileged group in the run-time to compute a likelihood of the individual bias;
  testing an individually biased sample by perturbing a protected attribute and checking the outcome after perturbation; and
  if the outcome after the perturbation is different from an original outcome, suggesting an individually biased sample as a de-biased prediction to an arbiter, which can choose between the original value of the bias and a de-biased prediction.

9. The post-processing computer-implemented method of claim 1, embodied in a cloud-computing environment.

10. A post-processing computer program product for post-hoc improvement of instance-level and group-level prediction metrics, the computer program product comprising a computer-readable storage medium having program instructions embodied therewith, the program instructions executable by a computer to cause the computer to perform:
  training a bias detector on a payload data that learns to detect a sample in a customer model that has an individual bias greater than a predetermined individual bias threshold value with constraints on a group bias, the sample being a member of an unprivileged group, wherein, during the training:
    the bias detector perturbs a protected attribute in the payload data for the unprivileged group and computes the individual bias as an individual bias score by finding a difference between a probability of a favorable outcome for the perturbed protected attribute to original data of the payload data;
    flagging the unprivileged group samples that have the individual bias greater than the predetermined individual bias threshold value; and
    training the bias detector to discriminate between the flagged samples and un-flagged samples;
  applying, in a run-time, the bias detector on a run-time sample to select a biased sample in the run-time sample having an individual bias greater than the predetermined individual bias threshold value; and
  suggesting, in the run-time, a de-biased prediction for the biased sample by perturbing the protected attribute and checking for bias after perturbation.

11. The post-processing computer program product of claim 10, wherein the applying and the suggesting operate in a post-processing that targets the biased sample with individual bias for remediation in order to change bias of the biased sample based both on individual and group fairness metrics.

12. The post-processing computer program product of claim 10, wherein the bias detector is trained by:
  for each sample point in the training set, obtaining an average individual bias after multiple perturbations;
  obtaining a difference in the individual bias for a favorable class;
  for a privileged group, setting the individual bias as the original detected individual bias;
  for the unprivileged group, setting the individual bias as the average individual bias; and
  sorting samples in the training set by descending order of the difference in the individual bias to the favorable class.

13. The post-processing computer program product of claim 10, wherein the suggesting the de-biased prediction is performed by:
  perturbing the protected attribute in a training set;
    picking a most likely prediction for the perturbed results run through the customer model; and
  changing the most likely prediction for the perturbed results for the unprivileged group member to a result for a favorable class.

14. The post-processing computer program product of claim 10, wherein, if the bias detector returns that a particular sample has bias, then that sample is de-biased.

15. The post-processing computer program product of claim 10, wherein a highest individual bias sample among the unprivileged group predicted by the bias detector is prioritized for a correction by the suggesting, and
  wherein a user decides whether to choose an original value of the bias or the suggested de-biased prediction.

16. A post-processing system for post-hoc improvement of instance-level and group-level prediction metrics, said system comprising:
  a processor; and
  a memory, the memory storing instructions to cause the processor to perform:
    training a bias detector on a payload data that learns to detect a sample in a customer model that has an individual bias greater than a predetermined individual bias threshold value with constraints on a group bias, the sample being a member of an unprivileged group, wherein, during the training:
      the bias detector perturbs a protected attribute in the payload data for the unprivileged group and computes the individual bias as an individual bias score by finding a difference between a probability of a favorable outcome for the perturbed protected attribute to original data of the payload data;
      flagging the unprivileged group samples that have the individual bias greater than the predetermined individual bias threshold value; and
      training the bias detector to discriminate between the flagged samples and un-flagged samples;
    applying, in a run-time, the bias detector on a run-time sample to select a biased sample in the run-time sample having an individual bias greater than the predetermined individual bias threshold value; and suggesting, in the run-time, a de-biased prediction for the biased sample by perturbing the protected attribute and checking for bias after perturbation.

17. The post-processing system of claim 16, embodied in a cloud-computing environment.

\* \* \* \* \*